United States Patent [19]

Rumble

[11] 4,401,324

[45] Aug. 30, 1983

[54] PIPE COUPLING WITH A LOCKING DEVICE

[75] Inventor: Ray M. Rumble, Canfield, Ohio

[73] Assignee: Michigan Pipe Fittings Co. Div. of Michigan Hanger Co., Hubbard, Ohio

[21] Appl. No.: 236,731

[22] Filed: Feb. 19, 1981

[51] Int. Cl.³ .............................................. F16L 21/08
[52] U.S. Cl. ..................................... 285/90; 285/369; 285/404
[58] Field of Search ................... 285/305, 404, 90, 91, 285/403, 369; 403/378, 379

[56] References Cited

U.S. PATENT DOCUMENTS

| | | | |
|---|---|---|---|
| 1,172,669 | 2/1916 | Caldwell | 403/362 X |
| 1,570,155 | 1/1926 | Karbowski | 285/90 X |
| 2,127,284 | 8/1938 | Board | 285/305 X |
| 2,935,342 | 5/1960 | Seamark . | |
| 3,139,480 | 6/1964 | Desloge | 285/404 X |
| 3,148,902 | 9/1964 | Gardner, Sr. et al. | 285/421 X |
| 3,158,388 | 11/1964 | Marshall . | |
| 3,284,561 | 11/1966 | Clements | 285/404 X |
| 3,669,475 | 6/1972 | Luckenbill et al. . | |
| 3,822,074 | 7/1974 | Welcker | 285/404 X |
| 3,841,672 | 10/1974 | Schultz et al. | 403/379 X |
| 4,138,146 | 2/1979 | Rumble | 285/39 |
| 4,289,339 | 9/1981 | Hansen | 285/404 X |

FOREIGN PATENT DOCUMENTS

| | | | |
|---|---|---|---|
| 2915391 | 10/1980 | Fed. Rep. of Germany | 285/305 |
| 19365 | of 1905 | United Kingdom | 285/404 |
| 12860 | of 1912 | United Kingdom | 285/403 |
| 26764 | of 1914 | United Kingdom | 285/404 |
| 875320 | 8/1961 | United Kingdom | 285/404 |

Primary Examiner—Thomas F. Callaghan
Attorney, Agent, or Firm—Harpman & Harpman

[57] ABSTRACT

A locking device for pipe couplings of the non-threaded type arranges an elongated rotatable cam transversely of the coupling in engagement with a pipe positioned therein and extending therefrom to forcefully engage the pipe in the coupling to prevent deviation from the axis of the coupling as well as rotation of the coupling relative to the pipe or vice versa.

5 Claims, 5 Drawing Figures

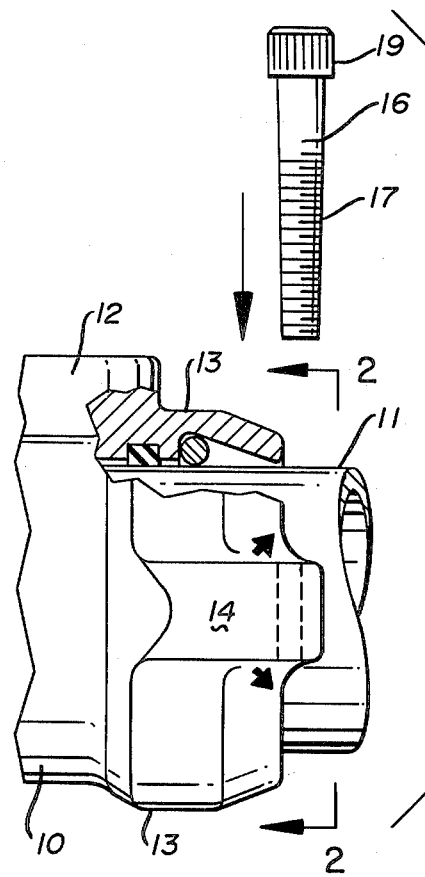
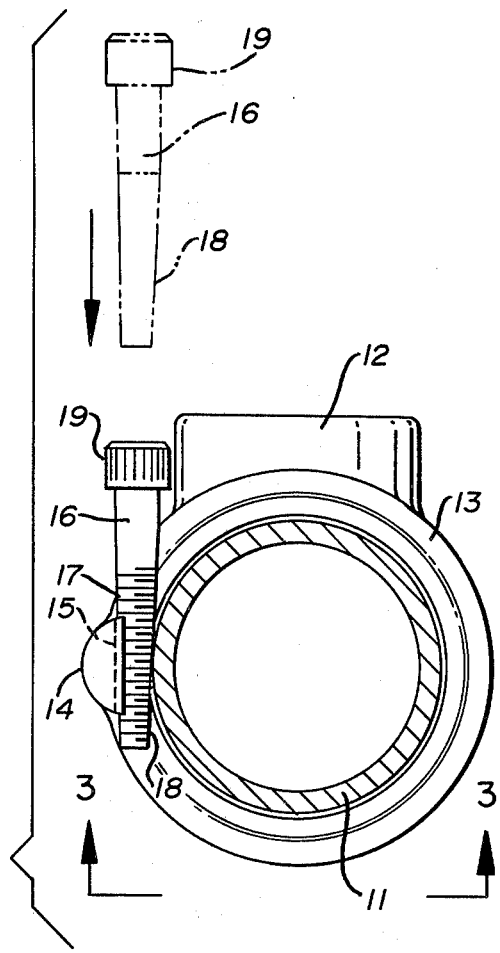
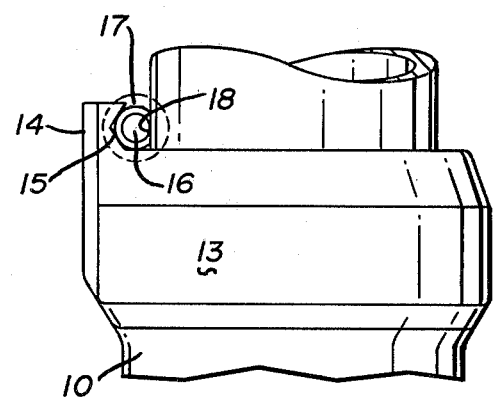
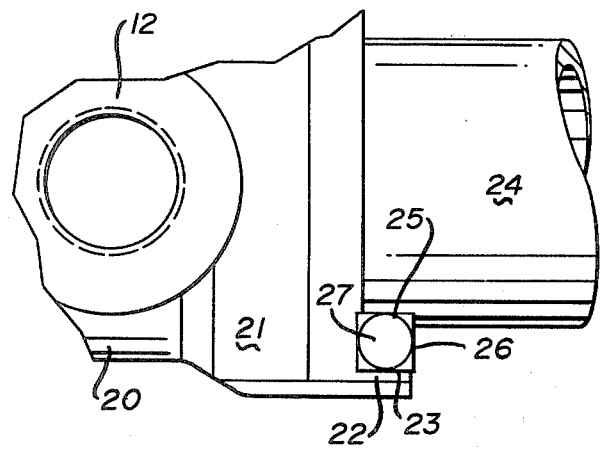
FIG. 1
FIG. 2
FIG. 4
FIG. 3

PIPE COUPLING WITH A LOCKING DEVICE

BACKGROUND OF THE INVENTION

(1) Technical Field

This invention relates to pipe couplings for connecting two pipe sections to one another and more particularly to a locking device that will hold the pipe in axial alignment with the coupling and prevent relative rotation between the pipe and the coupling.

(2) Description of the Prior Art

A pipe coupling with a cam tightening device is shown in U.S. Pat. No. 2,935,342 and takes the form of a split clamping ring and a pair of sleeves engagable therewith when the ends of the split ring are moved toward one another.

U.S. Pat. No. 3,148,902 discloses a coupling between spigot and bell ends of pipe sections and positions cam blocks in the area between the ends and provides means for moving the cam blocks relative to one another so as to wedge the pipe ends in connected position.

U.S. Pat. No. 3,158,388 utilizes spaced rings having annular cam surfaces wedging against a third ring and bolts for moving the spaced rings in a wedging action.

U.S. Pat. No. 3,669,475 shows a compression coupling in which bolts move inwardly of the ends of the coupling and urge annular wedges into opposed configurations of the coupling.

The present invention differs from each of these prior art disclosures in that the coupling, such as for example that shown in U.S. Pat. No. 4,138,146, is provided with a longitudinally extending offset boss arranged to cage and thereby position an elongated rotatable cam member against the side of a pipe engaged in the coupling. The rotatable cam member is thereby positioned transversely of the pipe and when moved into engagement between the pipe and the boss is rotated to bring its caming surface into position wedging the pipe so as to prevent the same from rotating relative to the coupling or the coupling from rotating relative to the pipe and more importantly to prevent the pipe from sagging as by moving out of its longitudinal axial alignment with the coupling.

SUMMARY OF THE INVENTION

A pipe coupling with a locking device is disclosed and which comprises a coupling such as shown in U.S. Pat. No. 4,138,146 in which pipes to be joined are positioned in endwise relation and moved relative to the coupling to engage a wedging contractible ring thereon. Such a coupling is provided with an offset longitudinally extending boss, the inner surface of which is arranged in spaced parallel relation to a pipe engaged in the coupling. An elongated rotatable cam member which is tapered longitudinally to form a cam surface is positioned between the boss and the pipe and upon being rotated locks the pipe to the coupling by wedging it tightly against the coupling and at the same time preventing relative rotation of the pipe and the coupling. The elongated cam member can be plain or provided with a thread pattern or knurled as desired and a typical coupling provides the longitudinally extending offset bosses on each end thereof so that a pair of pipes joined by the coupling are both locked securely into the coupling and the highly desirable longitudinal straight line axis of the pipe and the coupling maintained by the locking device.

DESCRIPTION OF THE DRAWINGS

FIG. 1 is an exploded side elevation of a portion of a pipe coupling showing the locking device with a portion thereof disengaged therefrom;

FIG. 2 is a cross sectional end elevation on line 2—2 of FIG. 1 showing the locking device assembled and in operative position;

FIG. 3 is a bottom elevation on line 3—3 of FIG. 2; and

FIG. 4 is a top plan view of a portion of a pipe coupling and a pipe therein and showing a modified form of locking device.

DESCRIPTION OF THE PREFERRED EMBODIMENT

Figure 5:
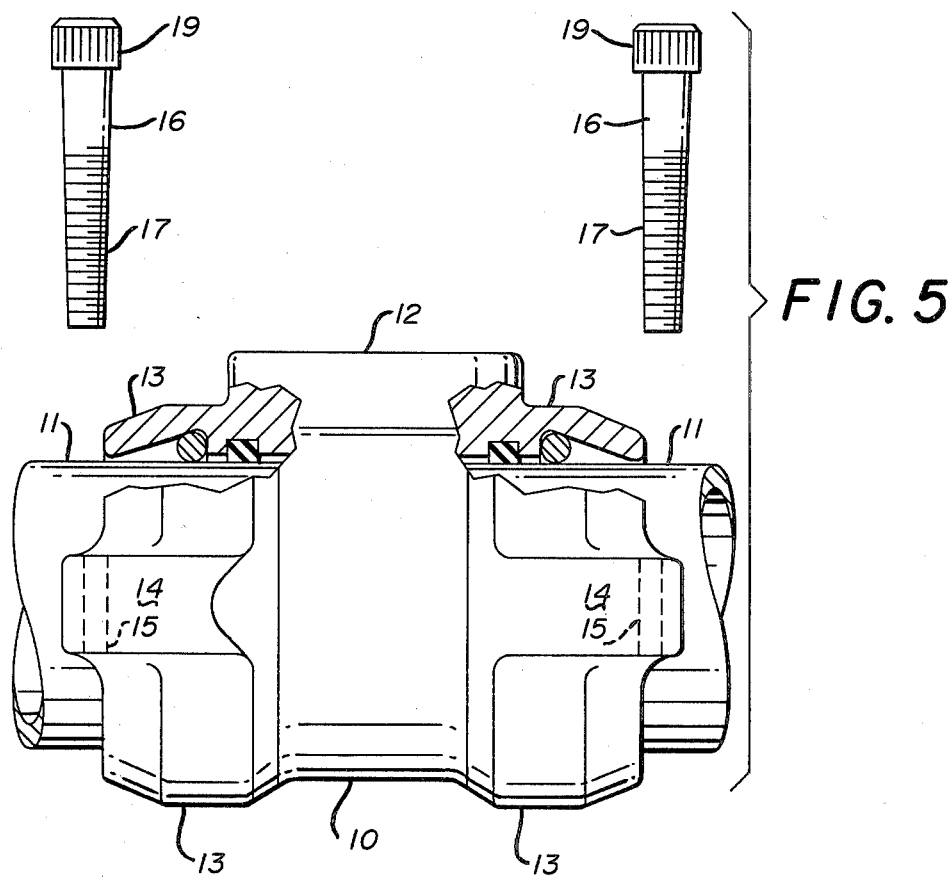
FIG. 5 is an exploded side elevation of the pipe coupling partly in cross section, showing the coupling engaged on a pair of pipes.

Two forms of the invention are disclosed herein and by referring to FIGS. 1, 2, 3 and 5 of the drawings the first and preferred form of the pipe coupling with a locking device may be seen.

In FIGS. 1, 2 and 3 of the drawings, a portion of a pipe coupling 10 is illustrated which comprises a coupling with a wedging contractible ring such as shown in U.S. Pat. No. 4,138,146. A section of a pipe 11 is shown engaged in one end of the coupling 10 and those skilled in the art will observe that such couplings have oppositely disposed similarly formed ends so that two sections of pipe can be joined to one another thereby. The coupling 10 has a sidewardly extending portion 12 in which a threaded opening is defined so that a sprinkler or other device may be positioned therein and placed in communication with the interior of the coupling as well as supported thereby.

The end of the coupling 10 is enlarged as at 13 and carries a projecting longitudinally extending offset boss 14 which is spaced sidewardly with respect to the side of the pipe section 11 as best seen in FIGS. 2 and 3 of the drawings.

A groove 15 is formed in the inner surface of the boss 14 as best illustrated in FIG. 3 of the drawings and as also indicated by the broken lines in FIGS. 1 and 2 of the drawings, the groove 15 being positioned transversely of the end of the coupling 10 and transversely of the pipe 11.

An elongated rotatable cam member 16 is illustrated in exploded relation to the coupling in FIG. 1 of the drawings and in operative relation to the coupling in FIG. 2 of the drawings. The elongated cam member 16 has a thread pattern 17 formed thereon throughout a majority of its length and a longitudinally tapered flat surface 18 on one side as best seen in FIGS. 2 and 3 of the drawings. The flat surface 18 extends inwardly of the elongated member 17 to a greater depth than the thread pattern 17 at the lower end of the member 16 and tapers upwardly and outwardly through the thread pattern as best seen in FIG. 2 of the drawings.

Still referring to FIG. 2 of the drawings, it will be seen that when the elongated cam member 16 is moved from the position shown in broken lines in FIG. 1 to the position shown in solid lines in FIG. 2, it will be positioned between the side of the pipe 11 and the inner side of the boss 14 and in partial registry in the groove 15. In order to lock the pipe 11 in the coupling 10, rotating motion is then applied to the head 19 of the elongated cam member 16 so as to revolve the same a quarter turn and thus forcefully engage the thread pattern 17 against the outer side of the pipe 11 and the inner side of the boss 14 as defined by the groove 15. In such forcefully engaged position the elongated cam member 16 holds the pipe 11 tightly in the coupling 10 and prevents the pipe from moving relative thereto and particularly with respect to deviations from the axial center line of the coupling and the pipe extending therealong. One of the major faults of the prior art couplings, including that of U.S. Pat. No. 4,138,146 is the tendency of the pipes joined by the coupling to move away from a common axial center line and the device of the invention herein disclosed prevents such movement.

An additional and highly desirable result is obtained in that the locking action of the elongated cam member 16 and there are two of them on each coupling, prevents any rotation of the coupling relative to the pipe sections joined thereby, which can otherwise occur.

Modifications of the device herein disclosed may be made and one such modification is illustrated in FIG. 4 of the drawings. By referring thereto it will be seen that a coupling 20 which has oppositely disposed enlarged end portions 21 is provided with a projecting longitudinally extending offset boss 22 which has a flat inner surface 23 in oppositely disposed relation to the side of a pipe 24 which also has a flat area 25 formed therein. An elongated cam member 26 which is cross sectionally square and has a round head 27 is shown in press fit engagement between the inner flat surface 23 of the boss 22 and the outer flat surface 25 of the pipe 24 so that the pipe 24 is held in fixed position relative to the coupling 20 and is also prevented from rotating relative thereto.

The modification as illustrated and described therefore comprises the change in the elongated cam member 26 from the generally round threaded member as seen in FIGS. 1, 2 and 3 of the drawings to the cross sectionally square member as seen in FIG. 4 of the drawings.

It will thus be seen that a pipe coupling with a locking device has been disclosed which can be relatively easily and inexpensively formed and more importantly easily assembled to join pipe sections and lock the same in fixed position therein. The resulting locked coupling and the pipes joined thereby are thus firmly held in desired axial alignment with the coupling being incapable of rotation relative to the pipe sections joined. The coupling always remains sealed and fluid tight under varying pressure conditions and the like which would tend to move the pipes relative to the coupling.

Although but two embodiments of the present invention have been illustrated and described, it will be apparent to those skilled in the art that various changes and modifications may be made therein without departing from the spirit of the invention and having thus described my invention what I claim is:

1. An improvement in a separable coupling for joining together a pair of pipes and having a cylindrical body with a pair of open ends, each for receiving one of said pair of pipes and means inwardly of said open ends for engaging said pipes and acting to hold said pipes in said coupling, sealing means in said coupling inwardly of said engaging means and longitudinally projecting offset bosses on each end of said coupling extending beyond said open ends in positions spaced with respect to the outer surfaces of said pipes positioned in said coupling; the improvement comprising rotatable elongated members positioned crosswise of and alongside said outer surfaces of said pipes beyond said open ends and between said projecting offset bosses and said outer surfaces of said pipes for wedging engagement therebetween.

2. The improvement in a separable coupling for joining together a pair of pipes set forth in claim 1 and wherein each of said rotatable elongated members is cross sectionally round and has a longitudinally tapered flat surface on one side thereof extending inwardly from one end thereof.

3. The improvement in a separable coupling for joining together a pair of pipes set forth in claim 1 and wherein each of said rotatable elongated members is cross sectionally round and has a longitudinally tapered flat surface on one side thereof extending inwardly from one end thereof and a thread pattern formed in the remainder thereof.

4. The improvement in a separable coupling for joining together a pair of pipes set forth in claim 1 and wherein a groove is formed in the inner surface of each of said bosses and arranged for registry with one of said elongated members, said grooves being positioned transversely of said bosses.

5. The improvement in a separable coupling for joining together a pair of pipes set forth in claim 1 and wherein said elongated members are cross sectionally square and wherein the inner surface of each of said bosses is flat and on a transverse plane with respect to said coupling.

* * * * *